April 3, 1956　　　F. T. IRGENS ET AL　　　2,740,368
VIBRATION AND SOUND DAMPING OUTBOARD MOTOR MOUNTING
Filed July 8, 1954　　　　　　　　　　　　4 Sheets-Sheet 1
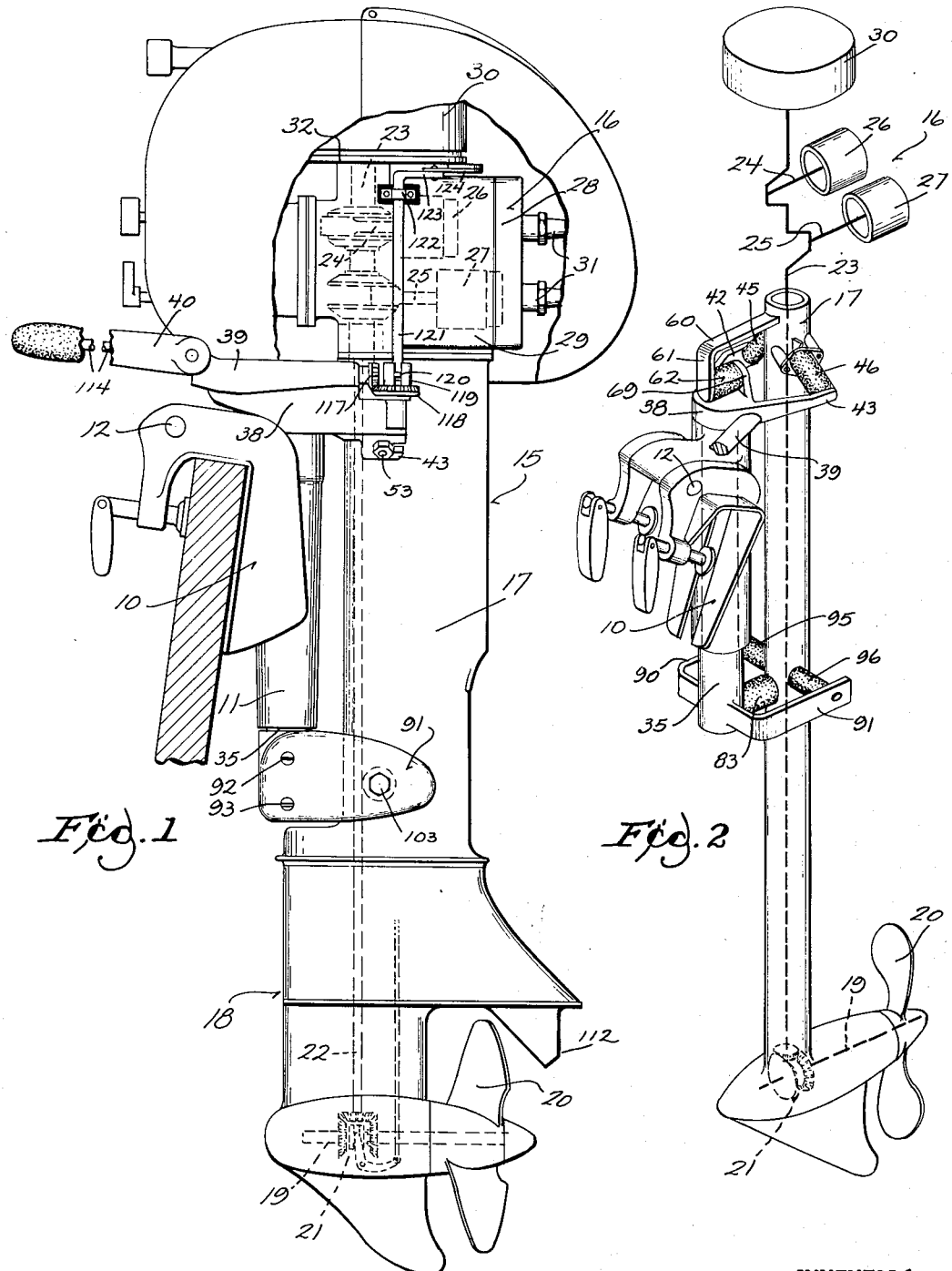
INVENTORS
FINN T. IRGENS
LUCIUS D. WATKINS
BY
Wheeler, Wheeler & Wheeler
ATTORNEYS

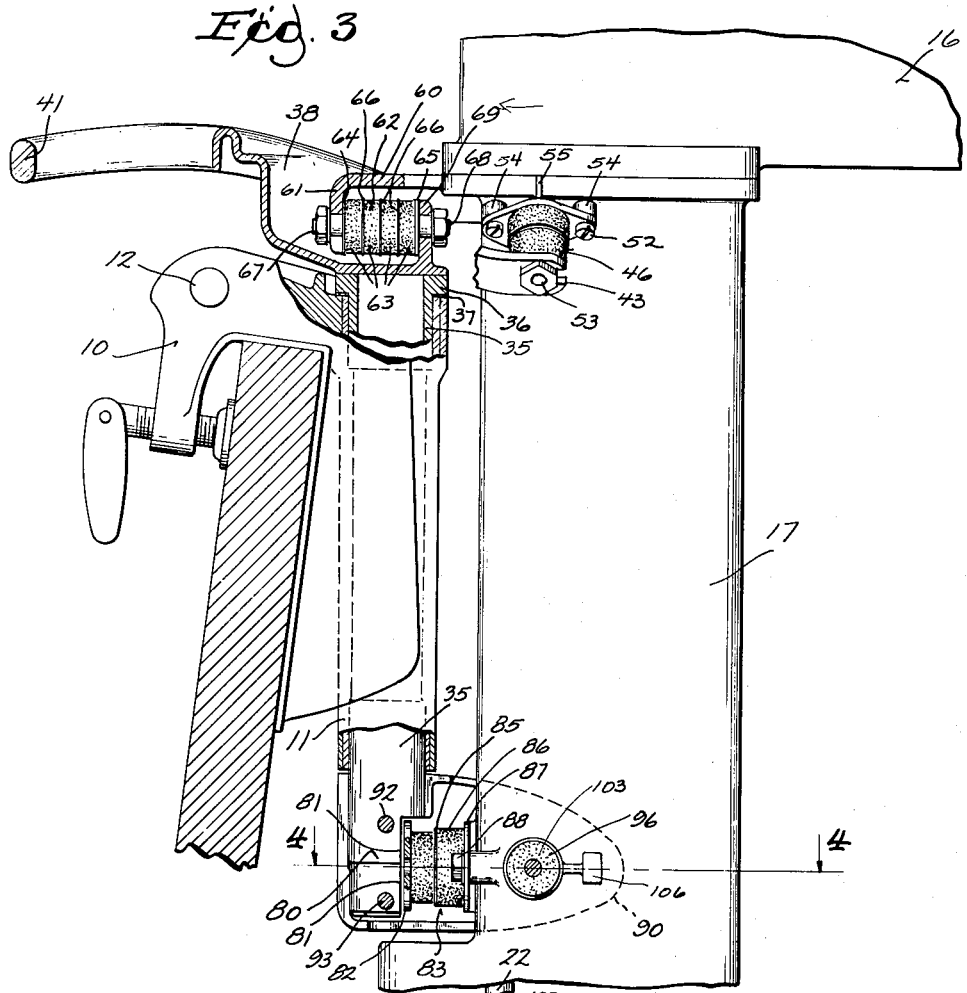
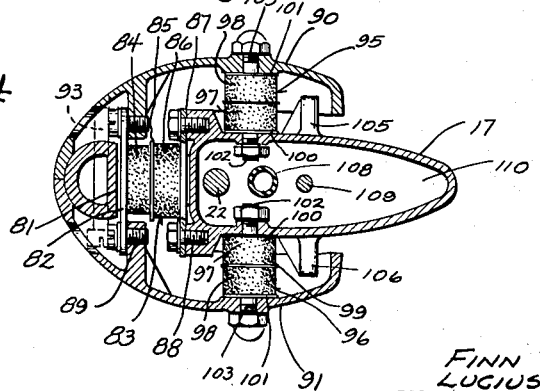

April 3, 1956  F. T. IRGENS ET AL  2,740,368
VIBRATION AND SOUND DAMPING OUTBOARD MOTOR MOUNTING
Filed July 8, 1954  4 Sheets-Sheet 3

INVENTORS
FINN T. IRGENS
LUCIUS D. WATKINS
BY
Wheeler, Wheeler & Wheeler
ATTORNEYS

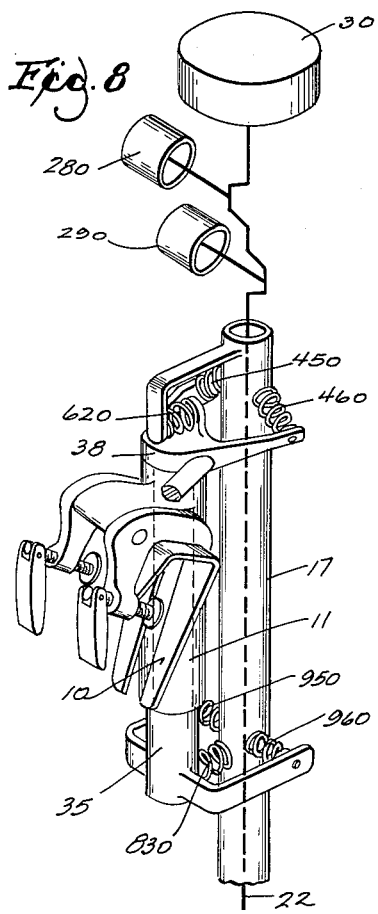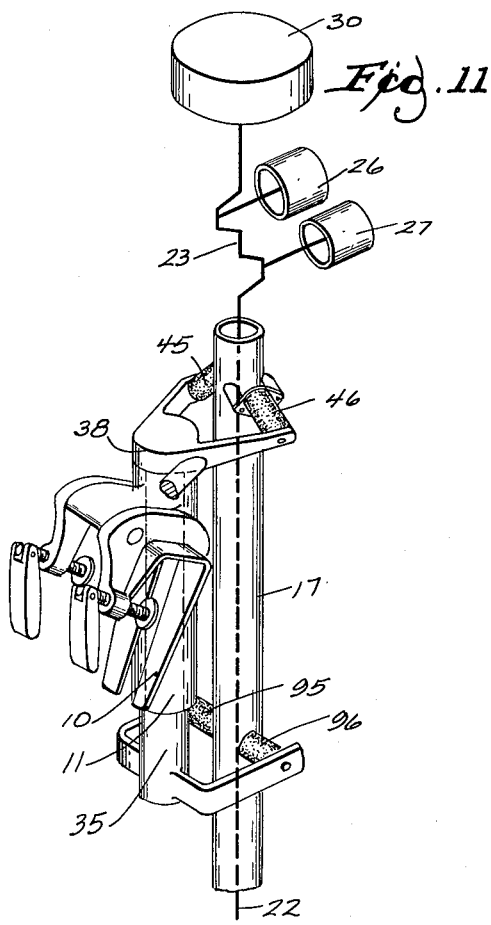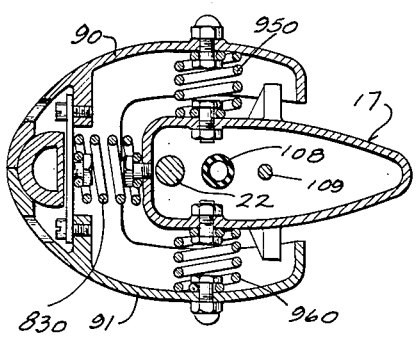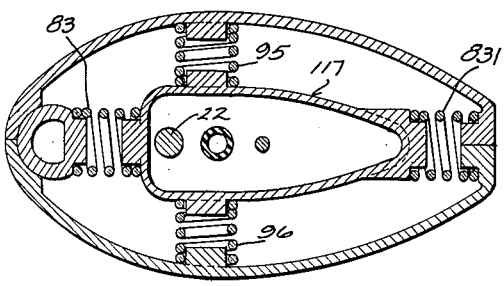

United States Patent Office 2,740,368
Patented Apr. 3, 1956

2,740,368

VIBRATION AND SOUND DAMPING OUTBOARD MOTOR MOUNTING

Finn T. Irgens, Milwaukee, and Lucius D. Watkins, Hartland, Wis., assignors to Outboard, Marine & Manufacturing Company, Waukegan, Ill., a corporation of Delaware Application July 8, 1954, Serial No. 442,022

21 Claims. (Cl. 115—18)

This invention relates to a vibration and sound damping outboard motor mounting.

The invention seeks not only to relieve an outboard motor tiller of vibration but to isolate the vibration from the mounting bracket and the boat as far as possible. A large part of the noise, which has heretofore characterized outboard motor operation, has been attributable to the transmission of sound and vibration mechanically from the outboard motor to the boat, which acts as a sounding board. We recognize the necessity of transmitting to the boat such forces as the weight of the motor, propeller thrust and propeller torque, and the forces acting on the steering surfaces of the lower unit and involved in steering or resistance to weaving and in inertia resistance to the action of rough water. Cushions provided to absorb vibration must provide adequate strength to resist the above forces in the directions in which such forces act. Yet the cushions should have minimum resistance in the directions in which they are subject to torsional vibration, vibration couples resulting from piston reciprocation and secondary vibrations of all sorts.

To provide adequate resistance to forces which must be met, and adequate softness to avoid vibration transmission to the boat, we use springs desirably made of natural or synthetic rubber which are disposed at a plurality of points between the propulsion unit and its mounting bracket and are positioned desirably in planes which are radial respecting the neutral axis of the propulsion unit. Moreover, the springs used should have a natural frequency well below the frequencies of propulsion unit vibration at low engine speeds.

As far as possible, the functions of the several springs are isolated by their form and location. In the preferred embodiment herein disclosed to exemplify the invention, the propulsion unit rotates for steering about an axis which is offset forwardly from the axis of its drive shaft and from the so-called neutral axis about which the propulsion unit tends to oscillate in response to torsional vibration. As distinguished from the outboard motor as a whole, of which the transom bracket is a part, the propulsion unit here referred to comprises the engine or power head, the lower unit or gear housing, and the intervening shaft housing which rigidly connects the power head with the gear housing. The operation of the engine which forms a part of this unit develops the various types of vibration above described. The transom mounting bracket provides an upright bearing sleeve within which a pintle is mounted for oscillation for steering purposes. The upper end of this pintle has arms projecting on opposite sides of the shaft housing to provide seats from which cushion springs extend upwardly and inwardly to engage the shaft housing in a transverse plane drawn diametrically through the neutral axis. These particular springs largely support the weight of the propulsion unit.

Projecting forwardly from the propulsion unit intermediate the arms which project rearwardly from the pintle is a third arm which extends beyond the pintle. Extending rearwardly from this third arm in a generally horizontal direction toward the neutral axis of the propulsion unit is a third cushion for which the pintle provides a rear abutment.

Similarly laterally spaced arms project rearwardly from the lower end of the pintle to provide abutments for another pair of springs which are substantially in the same plane, diametrically of the neutral axis, as the two springs first mentioned, but at a considerable lower level. A sixth spring extends fore and aft between the lower end of the pintle and the shaft housing of the propulsion unit at substantially the level of the fourth and fifth springs just described.

It is entirely practicable to use metal springs for the various cushions in accordance with one of the embodiments herein disclosed. However, it is preferred that all of the springs described shall be cushions of rubber or the like, desirably of a known construction which minimizes their resistance to displacement in the direction of shear, as compared with relatively much greater resistance to displacement in the direction of compression or tension. To this end, each of the springs desirably comprises component discs bonded to terminal and intermediate metallic elements. The intermediate elements restrict diametrical expansion or attenuation under axial load without substantial impairment of lateral yielding in the direction of shear.

A propulsion unit mounted as herein disclosed transmits to the transom bracket and the boat those forces which should properly react against the boat, while permitting great freedom of vibration of the unit independently of the transom bracket and the boat in response to forces creating vibrations which should be isolated. Since the tiller used in steering is connected with the pintle above described, and transmits steering movement to the propulsion unit solely through the springs, the tiller shares with the boat itself that freedom from vibration which is an objective of the invention. So great is the relative movement between the tiller and its controls on the one hand and the engine parts requiring control on the other hand that a special flexible motion transmitting connection is required between the manually operable control on the tiller and the speed control parts on the engine.

In the drawings:

Fig. 1 is a view in side elevation of an outboard motor embodying the invention, portions of the engine shroud being broken away and the transom of a boat being fragmentarily illustrated.

Fig. 2 is a view in perspective diagrammatically illustrating the cushion spring mounting of the propulsion unit from the steering pintle and transom bracket in the preferred embodiment of the invention.

Fig. 3 is an enlarged detail view partly in side elevation and partly in vertical fore and aft section showing the steering pintle and its connection to the shaft housing of the propulsion unit.

Fig. 4 is a view taken in horizontal section in the plane indicated at 4—4 of Fig. 3.

Fig. 8 is a fragmentary view similar to Fig. 2 diagrammatically showing a modified embodiment of the invention.

Fig. 9 is a horizontal cross section through the device diagrammatically illustrated in Fig. 8.

Fig. 10 is a horizontal cross section similar to Fig. 9 but showing the somewhat modified embodiment.

Fig. 11 is a fragmentary detail view in perspective showing an embodiment slightly modified from the device of Fig. 8.

Figure 5:
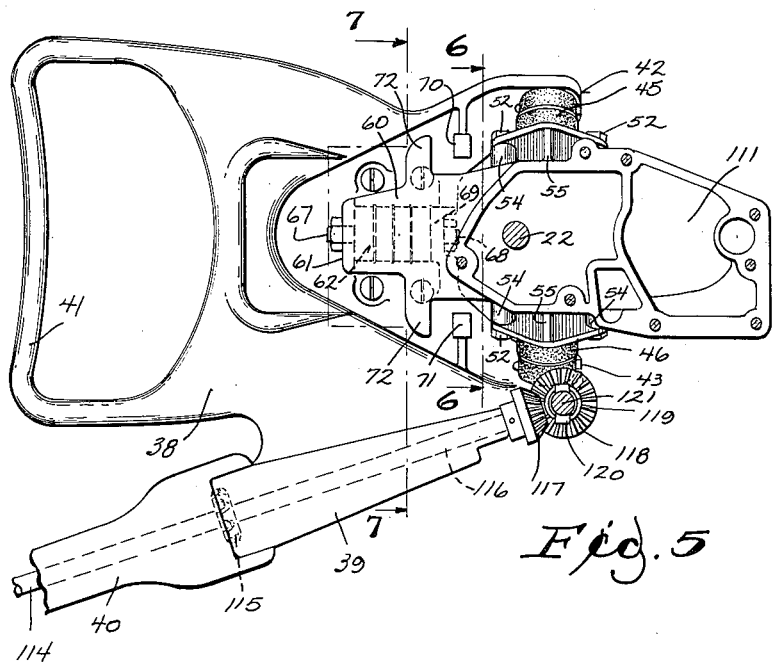
Fig. 5 is a plan view of the mechanism shown in Fig. 3 with the engine removed.
Figure 6:
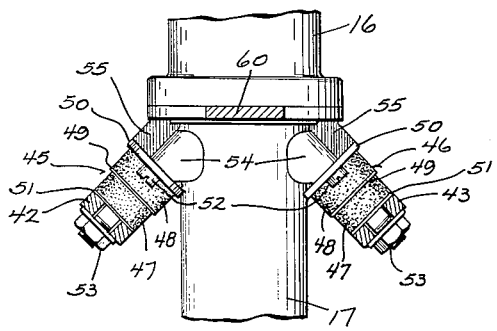
Fig. 6 is a detailed view taken in section generally in the plane indicated by the line 6—6 of Fig. 5.
Figure 7:
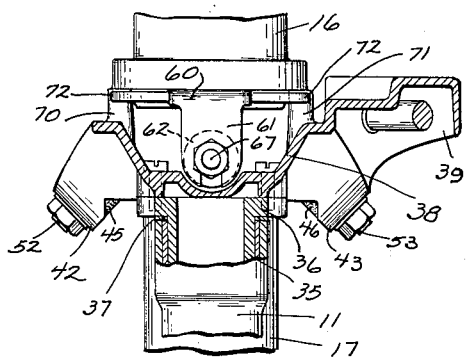
Fig. 7 is a detailed view taken in section generally in the plane indicated by the line 7—7 of Fig. 5.

The outboard motor selected to exemplify the invention comprises a transom bracket 10 to which the bearing sleeve 11 is pivoted at 12 for tilting adjustment in a vertical plane, this being conventional.

The propulsion unit generically designated by reference character 15 comprises a power head 16, shaft housing or strut member 17 and gear housing or lower unit 18. The gear housing supports a propeller shaft 19 upon which there is mounted propeller 20. Gearing such as that indicated at 21 in Fig. 2 connects propeller shaft 19 to an upright drive shaft 22 which is aligned with and desirably connected directly to the engine crank shaft 23. The cranks have the usual connecting rods 24, 25 connecting them with pistons 26, 27 which reciprocate in the cylinders 28, 29 of the power head. It is customary to incorporate a magneto (not shown) in the fly wheel 30 at the upper end of the crank shaft for supplying ignition current to the spark plugs 31. A conventional timer plate 32, with or without connection to the carburetor (not shown) controls engine speed.

During parts of each crank shaft rotation, the fly wheel 30 is receiving power during the expansion strokes of the respective pistons in the respective cylinders. During other parts of each rotation, the fly wheel 30 is delivering power to the crank shaft during the compression strokes of the respective pistons. The resulting vibration is known as torsional vibration. It tends to cause the entire propulsion unit, consisting of the rigidly connected power head shaft housing and gear housing, to oscillate around a generally upright axis known as the neutral axis. In previous outboard motor designs, it has generally been assumed that this axis coincides with the axis of drive shaft 22. It may in fact be offset materially from the drive shaft axis toward the center of mass of the unit and it is not even necessarily parallel to the drive shaft axis.

Particularly if the cylinders fire alternately, as is indicated by the positions of the pistons in Fig. 1 and Fig. 2, a vibration couple of forces in the plane of the cylinders is set up by the inertia of the respective pistons. There are also secondary vibrations occurring in the plane of the cylinders which must be dealt with. Other forces attributable to crank shaft balance weights connecting rod inertia etc. are taken into consideration.

Whenever means is employed to damp these various vibrations, or to isolate them from the transom bracket and the boat, it is nevertheless necessary to transmit certain forces to the boat. First among these is the weight of the outboard motor unit, which would fall unless supported. Secondly, there is the driving thrust of the propeller in forward or reverse, which must be transmitted to the boat to achieve the motion for which the outboard motor is employed. In the third place, the torque transmitted to the propeller through the bevel gearing 21 creates an equal and opposite reaction torque on the propulsion unit which must be resisted to keep the unit upright. Finally there are the thrusts exerted on the broad side surfaces of the lower unit as these are turned from side to side in steering or are subjected to wave slap in rough water.

In order to transmit these forces adequately, while minimizing the transmission of vibration, the following mounting is employed.

Instead of making the propulsion unit dirigible upon the axis of the drive shaft, as has frequently been done, we prefer to provide a steering pintle 35 which is mounted for oscillation in sleeve 11 at a point well forwardly of the shaft housing 17. This is not new in itself but it has important advantages for the purpose of the present invention. It permits design freedom in placement of the spring mounts. Particularly with motors of high power it may be desirable to use more mounts than here shown. At lower power fewer mounts may be used. The locations, however, will desirably always be in radial planes. The offset steering axis facilitates this disposition of the springs, regardless of number, without requiring an unduly large steering bearing. Fig. 11 shows an arrangement identical with that of Fig. 8 except for the omission of the thrust springs which are disposed in a fore and aft direction in the device of Fig. 8. Particularly in motors of light power it is appropriate to rely on the transmission of thrust in directions of shear. Thus, in the particular embodiment of Fig. 11 only four springs are used, these four being arranged in pairs on transverse diameters drawn through the neutral axis.

Fig. 10 is included merely to demonstrate the fact that instead of mounting the various springs to function in tension as well as in compression, it is possible to oppose one spring with another, whereby all are in compression. Thus spring 83 is opposed by spring 831.

An enlarged head 36 at the upper end of pintle 35 is seated on a thrust collar 37 engaged with the upper end of sleeve 11 to support the weight of the propulsion unit. To head 36 is bolted the tiller bracket member 38 which has a laterally projecting fitting at 39 from which the tiller handle 40 projects forwardly. The handle 41 is merely a lifting handle to facilitate manipulation of the outboard motor to and from position on the boat.

The tiller bracket 38 comprises a pair of rearwardly extending arms 42 and 43 which provide seats for the springs 45, 46. In the preferred form in which the springs are illustrated, each comprises a plurality of cushions 47, 48 and an intervening metallic plate or plates 49. The terminal cushions are bonded to terminal plates 50 and 51 respectively, these being secured by bolts or screws 52, 53 to the bracket arms 42, 43 and to the upper end of the lower unit 17.

Since natural or synthetic rubber is desirably used in the fabrication of the springs, it becomes desirable to protect these against engine heat and accordingly the mounting plates 50 at the upper and inner ends of the respective springs are desirably connected to abutment 54, 55 which project laterally and obliquely from shaft housing 17 to minimize heat conduction and to permit of heat rejection by radiation and by convection currents.

Projecting forwardly from the shaft housing or strut member 17 across the upper end of pintle 35 is a bracket arm 60 having its end downwardly turned at 61 to provide an abutment for the forward end of the spring generally designated by reference character 62. As in the case of springs 45 and 46, spring 62 desirably comprises a member of discs 63 of natural or synthetic rubber bonded to terminal metal plates 64, 65 and to intermediate plates 66. The terminal plate 64 is connected by bolt 67 with the down turned end 61 of bracket 60. The aft terminal plate 65 is connected by bolt 68 with a spring abutment 69 which projects upwardly from the tiller bracket 38 as an integral part thereof, as best shown in Fig. 3.

The tiller bracket further has stop elements 70 and 71 projecting inwardly toward the bracket arm 60, as best shown in Fig. 5 and lying between the abutment 54 and lugs 72 to provide a positive limit beyond which relative displacement of the outboard motor unit respecting the tiller bracket is not permitted.

The lower end portion 80 of pintle 35 is flattened, as best shown in Fig. 4. Its aft flattened surface 81 is engaged by the terminal plate 82 of the spring generally designated by reference character 83. As in the case of the springs previously described, this one is desirably a composite of natural or synthetic rubber sections. The forward section 84 is bonded to plate 82 and the intermediate plate 85. The aft section 86 is bonded to intermediate plate 85 and to the aft mounting plate 87. The latter is connected by bolts 88 to the shaft housing 17. The forward plate 82 is connected by bolts 89 to the right and left sections of bracket arms 90 and 91 which are also bolted to pintle 35 at 92 and 93, as shown in Fig. 3 and Fig. 4.

The arms 90 and 91 project aft at opposite sides of shaft housing 17 and are hollowed to partially enclose the lateral springs generally designated by reference characters 95 and 96. Each of these also desirably comprises natural or synthetic rubber cushions at 97 and 98 bonded to an intermediate metal disc 99 and to inner and outer terminal discs 100 and 101. Terminal discs 100 are connected by bolts 102 to the shaft housing 17, being disposed sufficiently close to the lower end thereof to permit access of a wrench. The outer terminal plates 101 are connected by bolts 103 to bracket arms 90 and 91. Unlike the springs 45 and 46 first described, the springs 95 and 96 are desirable substantially horizontal and may be in the same horizontal plane with spring 83.

Lugs 105 and 106 project laterally from the shaft housing into the cavities of the respective brackets 90 and 91, as best shown in Fig. 4 to provide means for positively limiting relative displacement of the shaft housing and the bracket arms in the event of breakage or excessive stress of one or more of the springs.

While cooling and gear shifting and disposition of exhaust gases form no part of the present invention, it may be noted that Fig. 4 shows a conventional cooling water pipe at 108, a gear shift rod at 109, and an exhaust passage at 110, for which the shaft housing has an inlet 111 (Fig. 5) and the lower unit has a discharge port 112 (Fig. 1).

Fig. 8 shows two alternative constructions either of which may be used individually. For one thing, the power head illustrated in Fig. 8 differs from that of Figs. 1 and 2 in that the cylinders 280 and 290 project laterally instead of being in a fore and aft plane. For reasons which it is unnecessary to detail here, this lateral disposition of the cylinders has important advantages in dealing with vibrations consequent upon piston reciprocation. It need only be noted, for the purpose of the present disclosure, that because of the necessity of transmitting propeller thrust, the springs which must be used in a fore and aft direction are ordinarily stronger than those which resist relative displacement laterally. Accordingly, if the vibrations resulting from the piston reciprocation occur in a lateral direction they can be dealt with by softer springs than as if they occurred fore and aft.

As an entirely separate feature of the disclosure of Fig. 8, coil springs are shown in lieu of the rubber cushions used as springs throughout the previous description. It is perfectly feasible to substitute coil springs 450, 460, 620, 830, 950 and 960 for the cushions 45, 46, 62, 83, 95, and 96, respectively. Elastic cushions are preferred only because of their vibration damping effect, a factor which is reduced in importance by using springs of very low frequency.

In all instances, however, whether the springs are metallic or non-metallic, their natural frequency should desirably be kept well below the frequencies of the vibrations to which they are subject at low engine speeds, it being understood that the lower the engine speed, the lower will ordinarily be the frequency of the vibration with which the engine mounting must deal.

When the engine is operated in its forward direction, the spring 83 will be under compression and the spring 62 under tension. The lateral springs 45, 46, 95, 96 will be subject to some deformation in the direction of shear but the pressures to which they will be subject will be relatively light, almost the entire thrust load being carried by springs 83 and 62.

Similarly when the propeller 20 is operated in reverse, springs 62 and 83 will transmit substantially the entire thrust. In this instance, spring 83 will be in tension and spring 62 in compression.

So far as torsional vibration is concerned, it will occur only in the direction of shear of the several springs. Vibrations resulting from piston movement will be absorbed in compression and shear by springs 62 and 83 in the device of Figs. 1 and 2 but will be absorbed in compression and shear by the relatively weaker lateral springs, whether metal or non-metallic, in the device of Fig. 8, it being understood that so far as the lateral disposition of the cylinders is concerned, this is a feature that is not limited to the use of metal springs but can be employed equally well with the non-metallic cushions of the remaining views.

The weight of the outboard motor unit is, of course, sustained quite largely by springs 45 and 46, all of the rest of the springs being solely in shear so far as the thrust of the weight of the parts is concerned. While numerous other arrangements are possible this disposition of the springs is the best that we have found if the weight is to be sustained by the springs themselves.

In accordance with conventional practice, the outboard motor tiller 40 comprises a speed control shaft 114 universally coupled at 115 (Fig. 5) to the shaft 116 which carries the driving pinion 117 (Fig. 1) for oscillating gear 118. The hub 119 of gear 118 has a universal connection at 120 with shaft 121 which extends upwardly beside the power head and has a cushioned bearing at 122, permitting the shaft to yield in response to relieve movement between the outboard motor unit and the tiller bracket. Above the bearing 122 the shaft 121 has a crank 123 connected by link 124 with the timer plate 32 for regulating engine speed. Thus, no matter how greatly the outboard motor unit moves about in its mounting, a relatively positive motion transmitting connection will be maintained to the speed control and little or no vibration will be communicated through these connections to the tiller.

Experience with an outboard motor constructed in accordance with the disclosure of this application shows remarkably reduced noise level and substantially complete absence of vibration from the tiller and boat.

We claim:

1. In an outboard motor the combination with a transom bracket and a dirigible power unit having a neutral axis extending in a generally upright direction substantially proximate its center of mass and about which said unit tends to oscillate, of means for mounting said unit from said bracket and including spring means having resultant thrust respectively extending fore and aft and laterally in planes substantially radial respecting said axis, and having mounts respectively connected with the bracket and unit, the unit including a prime mover subject to vibration at a frequency varying in accordance with its speed and the springs having a natural frequency lower than the frequency of vibration resulting from prime mover operation at any normal speed.

2. An outboard motor comprising the combination with a transom bracket and a propulsion unit having a power driven propeller with a generally fore and aft axis and a steering connection with said bracket and a generally upright neutral axis about which said unit tends to vibrate and which extends in a generally upright direction substantially proximate its center of mass and about which said unit tends to oscillate, of means for mounting said unit from said bracket and including discrete springs disposed in various substantially radial positions about said axis and having their respective abutments in planes substantially radial respecting said axis whereby to be subject to torsional vibration thrusts in shear.

3. An outboard motor comprising the combination with a transom bracket and a propulsion unit having a power driven propeller with a generally fore and aft axis and a steering connection with said bracket, said unit having a generally upright neutral axis which extends in a generally upright direction substantially proximate its center of mass and about which said unit tends to oscillate, of means for mounting said unit from said bracket and including springs disposed in various positions about said neutral axis and having their respective abutments in planes substantially radial respecting said neutral axis, certain of said springs disposed laterally of said unit at opposite sides thereof having vertically offset abutments and upward components of direction between their respective abutments, whereby to be adapted to support the weight of the unit, and certain of said springs having components of direction extending fore and aft at points spaced vertically whereby to be adapted to transmit thrust to said bracket.

4. An outboard motor comprising the combination with a transom bracket and a steering sleeve mounted thereon, of a pintle oscillatably disposed in the sleeve, a propulsion unit including a power head and having a generally upright neutral axis about which it tends to vibrate, said unit being disposed behind said sleeve, brackets connected with the pintle above and below the sleeve and providing spring abutments and springs engaging said abutments and engaging said unit and disposed at various points about said axis and constituting means for yieldably supporting said unit from said pintle.

5. The device of claim 4 in which certain of said springs extend generally fore and aft between said unit and the upper and lower brackets connected with the pintle, both of said brackets providing laterally spaced arms between which portions of said unit are disposed, other springs being interposed between the respective arms and the unit in opposite positions at the sides of the unit.

6. The device of claim 5 in which all of the several springs are disposed in planes which are substantially radial with respect to the neutral axis of the unit.

7. The device of claim 5 in which certain of said springs at opposite sides of the unit have corresponding upward components of direction and together provide support for the weight of the unit from the respective bracket arms abutted by said springs.

8. The device of claim 5 in which said springs comprise non-metallic cushions.

9. The device of claim 5 in which certain of said springs extend fore and aft between their respective abutments and have compression and tension connections to both abutments, the said fore and aft springs having greater resistance to unit displacement than springs laterally engaged with said unit.

10. In an outboard motor the combination with supporting means and a power unit, of a set of springs constituting the entire mounting of the power unit from the supporting means, the power unit having a generally upright neutral axis about which it tends to vibrate and the supporting means and power unit having spring abutments complementary to each other in pairs which are in planes substantially radial respecting said axis, certain of said springs at vertically spaced levels having fore and aft disposition and sufficient strength to transmit thrust of said unit and being connected to their respective abutments at both ends whereby to be adapted to function in tension as well as in compression, other and relatively lighter springs being disposed in opposed positions at opposite sides of the unit, and still other springs having a substantial vertical component of direction in the said planes and being adapted to support the weight of the unit, all of the springs being freely yieldable laterally in directions of shear to accommodate oscillation of said unit about said axis.

11. The device of claim 10 in which said supporting means comprises a transom bracket having a swivel bearing, a pintle rotatably mounted in said bearing and members connected with the top and bottom of said pintle providing the spring abutments of said supporting means.

12. The device of claim 11 in which the several springs comprise elastic cushions having a natural frequency lower than any normal frequency of vibration of said unit.

13. In an outboard motor the combination with a transom bracket, of a swivel bearing mounted thereon, a steering pintle rotatable in the swivel bearing, a tiller bracket connected with the upper end of the pintle and overlying the swivel bearing and provided with laterally spaced aft-projecting arms, a third bracket connected with the lower end of the pintle and having laterally spaced aft-projecting arms, a propulsion unit including a power head, shaft housing and gear housing in unitary connection disposed between the arms of the transom bracket and the third bracket, said unit having a drive shaft extending through the drive shaft housing from the power unit to the gear housing and having a propeller shaft and propeller mounted on the gear housing and gearing connecting the drive shaft with the propeller shaft, supporting springs at opposite sides of the drive shaft having engagement with said unit and respective arms of one of the brackets connected with the pintle, said springs having a substantial component of vertical direction and being freely yieldable in a direction of shear in response to vibration of said unit above the drive shaft axis, thrust springs connected with upper and lower portions of said unit and respectively with the brackets attached to the top and bottom of the pintle, and having substantial components of direction fore and aft for transmission of propeller thrust, said last mentioned springs being freely yieldable laterally in a direction of shear to accommodate vibration of said unit about the axis of its propeller shaft, together with other springs between said unit and at least one of said brackets having components of direction which are substantially radial, said other springs being disposed laterally respecting the unit and being freely yieldable in directions of shear to accommodate vibration of said unit about the axis of its drive shaft.

14. The device of claim 13 in which said springs comprise elastic cushions, all of which are disposed in planes which are substantially radial respecting said unit.

15. The device of claim 13 in which the brackets connected with the upper and lower ends of the pintle have abutments between their laterally spaced arm portions for the said thrust transmitting springs, the latter springs being fixed to said abutments and also to their respective abutments on said unit for transmission of propeller thrust in tension as well as in compression.

16. The device of claim 13 in which the thrust transmitting spring at the top of the pintle extends across the upper end of the pintle, the said unit having an arm extending over the pintle and said last mentioned spring and provided with an abutment for the last mentioned spring at the forward end thereof, said bracket having its abutment for the last mentioned spring at the aft end thereof and said last mentioned spring being connected with both of its said abutments to transmit thrust in tension as well as in compression.

17. The device of claim 13 in further combination with a tiller mounted on the tiller bracket, a speed regulating rotor mounted on the tiller bracket, a speed control member mounted on the prime mover of said unit, and flexible motion transmitting connections from said rotor to said member for actuating said member from said rotor in any position of movement of said unit on said springs.

18. In an outboard motor the combination with a transom bracket and a swivel bearing mounted thereon, of a second bracket pivoted at the upper end of the swivel bearing for oscillation in a generally horizontal plane and comprising laterally spaced arms projecting aft from the swivel bearing and a spring abutment projecting upwardly from a position between said arms, a third bracket pivotally mounted adjacent the lower end of the swivel bearing for movement in a generally horizontal plane and provided with laterally spaced arms projecting aft and with a spring abutment between said arms, a propulsion unit including a shaft housing disposed between the arms of the second and third brackets and having a power head fixed to its upper end and a gear housing fixed to its lower end, and springs constituting substantially the sole connection between the propulsion unit and said brackets, said springs including supporting and thrust transmitting and centering springs, said power unit including a propeller having driving connections from said power head to develop thrust for transmission to the transom bracket, the thrust transmitting springs being engaged with respective abutments aforesaid between the shaft housing and the second and third brackets, the arms of one of said brackets having supporting spring abutment means and the arms of the other of said brackets having centering spring abutment means.

19. The device of claim 18 in which said unit has a neutral axis about which the several springs are disposed in planes substantially radial respecting said axis, all of the springs being freely yieldable in directions of shear in response to oscillation of the unit about said axis and all of the springs having natural frequencies lower than major frequency of vibration to which said unit is normally subject.

20. The device of claim 18 in which the power head includes a speed control member, the outboard motor further comprising in association with one of said brackets a controller having flexible motion transmitting connections leading in a generally vertical direction to said member for transmission of speed controlling motion thereto irrespective of vibration of said unit.

21. An outboard motor comprising the combination with a transom bracket and a propulsion unit having power driven propeller and a steering connection with said bracket and a neutral axis extending substantially through the center of mass of said unit in a direction approximately at right angles to the propeller axis and about which said unit tends to vibrate, of means for mounting said unit from said bracket and including discrete springs disposed in various positions about said axis and having their respective abutments in planes substantially radial respecting said axis whereby torsional vibration thrust is transmitted to said springs in shear, said propulsion unit comprising an internal combustion engine having cylinder and piston means disposed substantially horizontally at right angles to the direction of propeller thrust.

References Cited in the file of this patent

UNITED STATES PATENTS

| | | |
|---|---|---|
| 2,127,744 | Linthwaite | Aug. 23, 1938 |
| 2,209,592 | Beck | July 30, 1940 |
| 2,256,831 | Karey | Sept. 23, 1941 |